United States Patent [19]

Grimes

[11] Patent Number: 5,463,488
[45] Date of Patent: Oct. 31, 1995

[54] DISTRIBUTION OF CLOCK SIGNALS BY PUMP POWER MODULATION IN AN OPTICALLY AMPLIFIED NETWORK

[75] Inventor: Gary J. Grimes, Thornton, Colo.

[73] Assignee: AT&T IPM Corp., Coral Gables, Fla.

[21] Appl. No.: 301,152

[22] Filed: Sep. 6, 1994

Related U.S. Application Data

[63] Continuation of Ser. No. 922,896, Jul. 31, 1992, abandoned.

[51] Int. Cl.$^6$ .............................. H04B 10/02; H04B 10/14
[52] U.S. Cl. .......................... 359/128; 359/160; 359/158; 359/117
[58] Field of Search ................................ 370/100.1, 103, 370/109, 16; 359/113, 117, 114, 120, 124, 127, 134, 133, 152, 158, 159, 160

[56] References Cited

U.S. PATENT DOCUMENTS

| | | | |
|---|---|---|---|
| 4,747,094 | 5/1988 | Sakaguchi et al. | 370/4 |
| 4,791,407 | 12/1988 | Prucnal et al. | 341/68 |
| 4,879,761 | 11/1989 | Webb | 330/308 |
| 5,083,874 | 1/1992 | Aida et al. | 385/24 |
| 5,185,826 | 2/1993 | Dalavaux | 359/134 |
| 5,212,578 | 5/1993 | Grimes et al. | 359/124 |
| 5,229,876 | 7/1993 | Fatehi et al. | 359/160 |
| 5,299,048 | 3/1994 | Suyama | 359/134 |

FOREIGN PATENT DOCUMENTS

| 497630 | 3/1992 | Japan | 359/138 |
|---|---|---|---|

OTHER PUBLICATIONS

N. K. Ailawadi, et al., *Wavelength–Multiplexed Bit Synchronization in Optical Transmission*, IEEE Communications Society, IEEE Global Telecommunications Conference, Dec. 2–5, 1991, pp. 423–429.

H. M. Presby et al., *Amplified Integrated Star Couplers with Zero Loss*, IEEE Photonics Technology Letters, vol. 3, No. 8, Aug. 1991, pp. 724–726.

*Primary Examiner*—Douglas W. Olms
*Assistant Examiner*—Huy D. Vu
*Attorney, Agent, or Firm*—John C. Moran

[57] ABSTRACT

Transmission of clock signals at the pump wavelength of an optical amplifier utilized to amplify data signals being communicated in an optical network. The clock signals synchronize the data signals to a terminal utilizing the optical network. The pump wavelength is generated by a pump laser which supplies the amplification power for the optical amplifier. The clock signals are communicated on the pump optical wavelength by directly modulating the pump laser or by using an external modulator which inhibits the transmission of the pump laser's output.

5 Claims, 3 Drawing Sheets

DISTRIBUTION OF CLOCK SIGNALS BY PUMP POWER MODULATION IN AN OPTICALLY AMPLIFIED NETWORK

This application is a continuation of application Ser. No. 07/922896, filed on Jul. 31, 1992, and now abandoned.

TECHNICAL FIELD

This invention relates to the switching and synchronization of data and, in particular, to the distribution of clock signals.

BACKGROUND OF THE INVENTION

Prior art optical switching systems that utilize time division multiplexing face the difficult problem of properly distributing clock signals with very little skew between the clock signals and data signals. This is of particular importance when a high speed optical backplane is utilizing an optically amplified star coupler. One method that has been devised to overcome this problem is to derive the clock from the incoming data bit-stream using a phase-locked loop circuit. While this technique has worked well for lower speed systems, it is bulky and costly, it requires more power and it does not work well in all-optical systems because of the high speeds that are involved.

A second method for solving this problem is set forth in the article entitled, "Wavelength-Multiplex Bit Synchronization in Optical Transmission", IEEE Global Telecommunications Conference, Dec. 2–5, 1991. The method proposed in this article is to use wavelength division multiplexing (WDM). At the transmitter, the clock and data bit streams are generated on lasers of two different wavelengths, and the two wavelengths are wavelength multiplexed together onto the same optical fiber. At the receiver, these signals are wavelength demultiplexed. The demultiplexed clock signal at the receiver is used as a strobe to bit synchronize the incoming data stream. The problem with this prior art WDM method is the need for two lasers and an optical wavelength multiplexer at each transmitter. In addition, the loss resulting from the wavelength multiplexer has to be compensated on each outgoing link from the star coupler with an optical amplifier. Finally, the use of different lasers to transmit the dock signals requires solving the difficult problem of making the phases of the clock signals on different optical fibers equal.

A third method is set forth in U.S. patent application Ser. No. 07/738,407 by G. J. Grimes, filed Jul. 31, 1991. This patent application sets forth a method that also uses WDM but returns phase and frequency information to a terminal so that the terminal can synchronize its clock with the central clock of an optical switching system. This method has the same problems as the second method given in the previous paragraph; and in addition, it requires the calculation of phase and frequency information.

Optical amplifiers, such as erbium-doped fiber amplifiers, are well known. Patent application Ser. No. 07/499112, by M. T. Fatehi et al., filed on Mar. 26, 1990, discloses such optical amplifiers. An erbium-doped fiber amplifier functions by pumping the erbium-doped fiber to near quantum-limited noise performance using laser, with a wavelength for example of 0.98 micrometers, which is connected to the fiber and combining the pumped input wavelength with a data signal (for example at a wavelength of 1.55 micrometers). The result is that the data signal is amplified. Fatehi discloses a optical transmission path which has optical amplifiers at fixed distances along the optical transmission path. In order to monitor the various optical amplifiers, each optical amplifier is capable of having the pump wavelength modulated at a low frequency to allow the transmission of a telemetry signal on the pump wavelength. This allows the monitoring of the operation of the optical amplifiers and also allows service personnel a communication facility with a central location.

SUMMARY OF THE INVENTION

The aforementioned problems are solved and a technical advance is achieved in the an by the transmission of clock signals on the pump wavelength of an optical amplifier utilized to amplify data signals being transmitted in an optical network. The clock signals synchronize the data signals for a terminal utilizing the optical network. The clock signals are communicated on the pump optical wavelength by directly modulating the laser utilized to generate the pump optical wavelength or by using an external modulator which inhibits the transmission of the pump laser's output.

DETAILED DESCRIPTION

Figure 1:
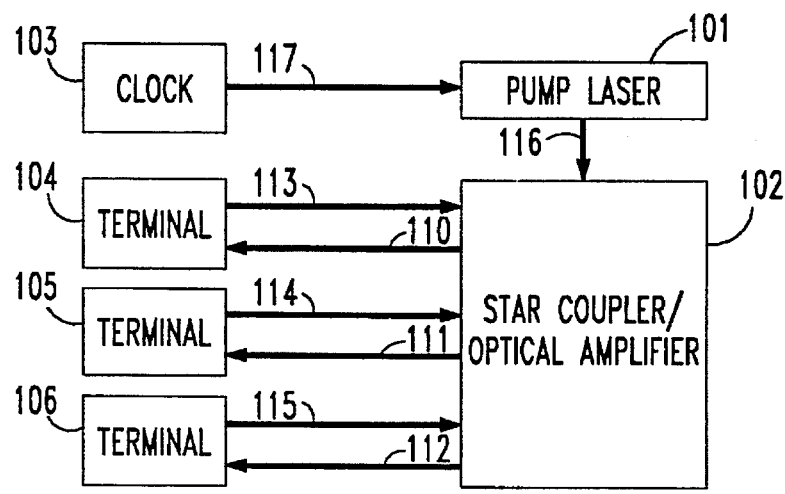
FIG. 1 illustrates in block diagram form, an optical switching system in accordance with the invention.

FIG. 1 illustrates a system in accordance with the invention. Star coupler/optical amplifier 102 combines data signals communicated on an optical data wavelength which is received via optical fibers 113 through 116 with clocks signals communicated on an optical pump wavelength which is received from pump laser 101 and transfers these combined optical wavelengths to output optical fibers 110 through 112. Each terminal transmits and receives data in assigned time slots of a data frame. Techniques for assigning time slots to terminals are well known in the art. Star coupler/optical amplifiers, such as element 102, are well known in the art, and the article entitled "Amplified Integrated Star Couplers with Zero Loss", IEEE Photonics Technology Letters, Vol. 3, No. 8, Aug. 1991, by H. M. Presby, et al. describes such a device. Pump laser 101 supplies the optical power to do the amplification by transmitting this optical power into star/optical amplifier 102 via optical fiber 116. Pump laser 101 is responsive to the output of clock 103 received via path 117 to modulate the pump wavelength with the clock signals which are illustrated on line 304 of FIG. 3. The optical output of pump laser 101 is illustrated on line 302 of FIG. 3. Since the pump laser wavelength is combined with the wavelengths received on optical fibers 113 through 115, each output optical fiber from star coupler/optical amplifier 102 transports the clock signals via the pump laser wavelength to terminals 104 through 106 on output optical fibers 110 through 112.

Figure 3:
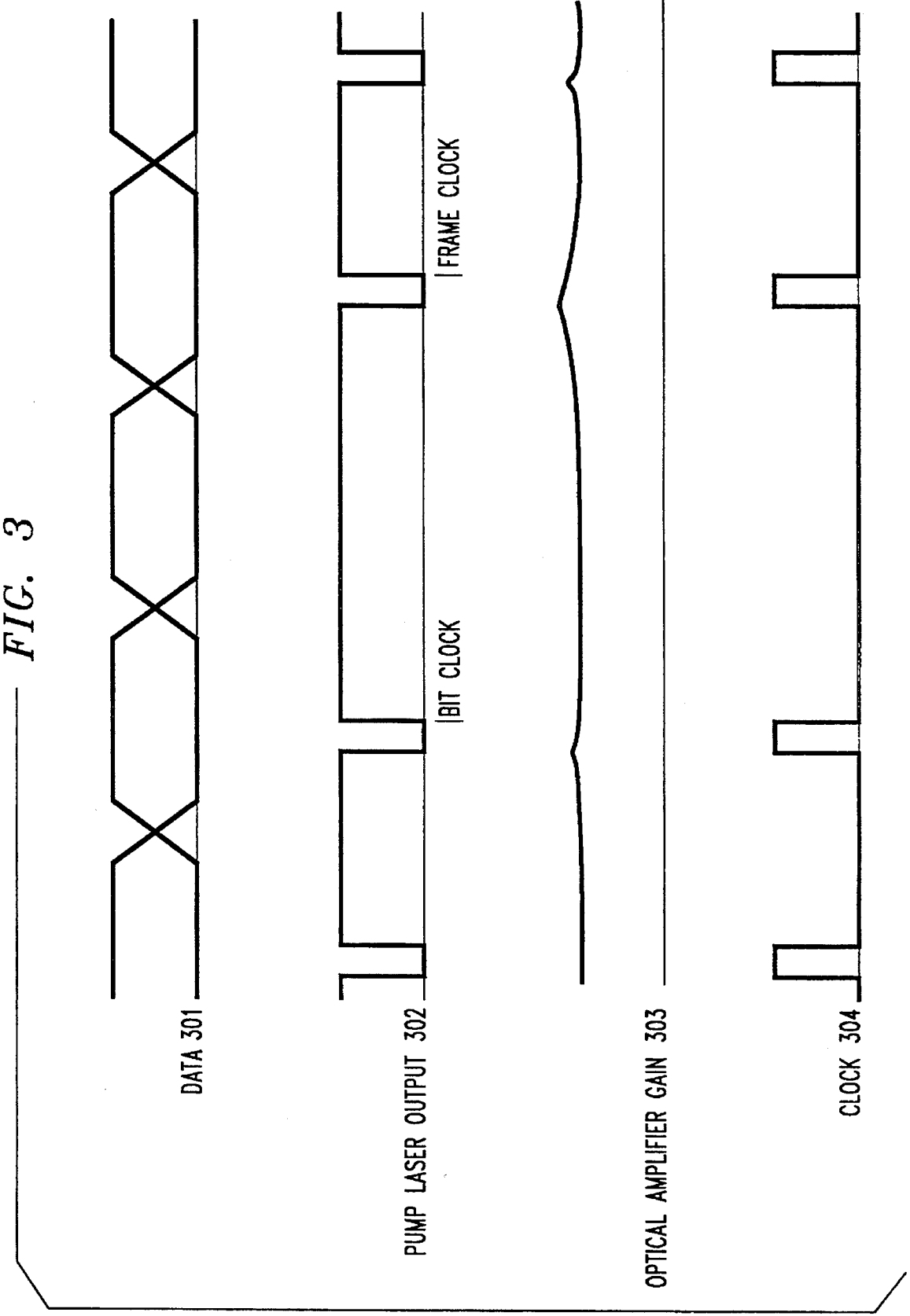
FIG. 3 illustrates the relationship between the clock signals and the data signals.

Each terminal is responsive to the information being communicated on an output optical fiber to separate the data wavelength from the optical pump wavelength through the use of wavelength demultiplexers. Such demultiplexers are required in all systems using pump laser optical amplifiers to prevent the optical pump wavelength from interfering with recovery of the data wavelength. The present invention takes advantage of this demultiplexing to communicate the clock signals on the optical pump wavelength. The present invention advantageously guarantees that the clock signals communicated on the optical pump wavelength on each of the output optical fibers are in phase with each other since the clock signals are transferred through common elements. Once the pump laser wavelength has been demultiplexed, the clock signals are recovered and are utilized to synchronize the recovery of the data signals from the optical data wavelength. Also, the clock signals are used to detect the start of a data frame. The end of a data frame is indicated by a missing clock signal as illustrated in FIG. 3. In addition, terminals 104 through 106 utilize the recovered clock signals to synchronize the transmission of data signals back to star coupler/optical amplifier 102 on input optical fibers 113 through 115.

Figure 2:
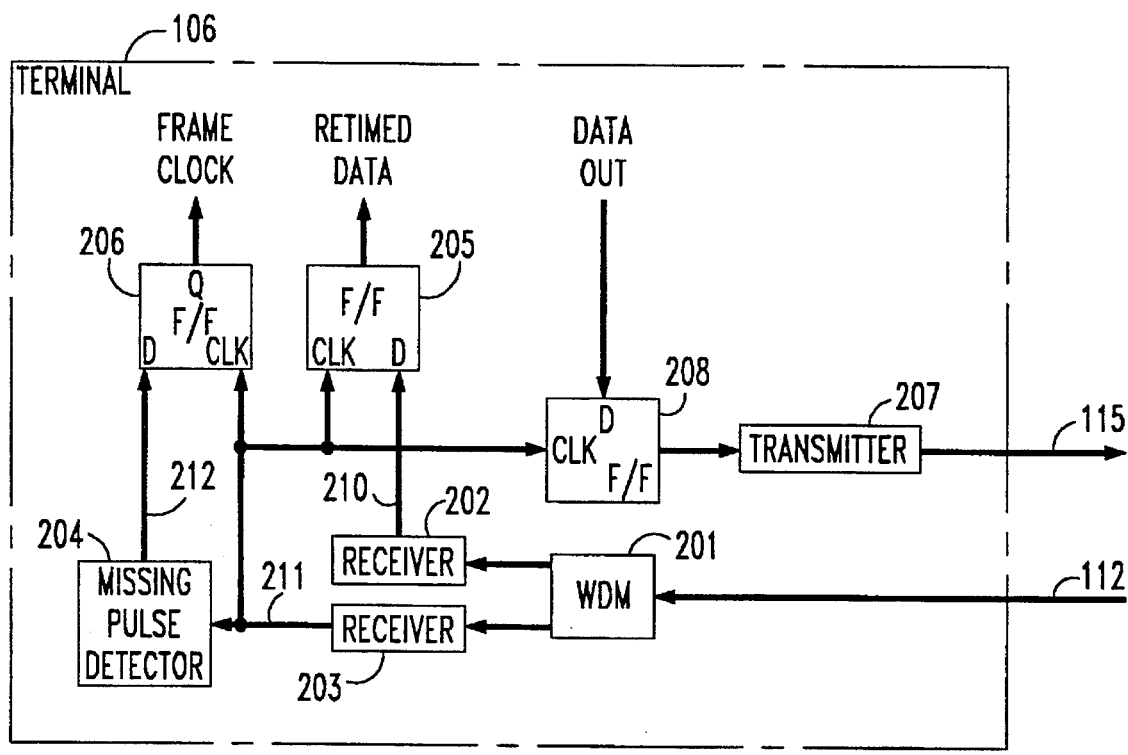
FIG. 2 illustrates the circuit utilized in each optical terminal of FIG. 1 to synchronize the data signals with the clock signals.

FIG. 2 illustrates the timing circuitry for the recovery of the data and clock signals being received from output optical fiber 112 by terminal 106. The remainder of terminal 106 processes the re-timed data signals from flip-flop 205 using the frame clock from flip-flop 206 and generates the data out signals which are transferred to optical fiber 115 via flip-flop 208 and transmitter 207. Wavelength division multiplexer 201 is responsive to the optical wavelengths being received from optical fiber 112 to demultiplex and transfer the optical data wavelength to receiver 202 and to demultiplex and transfer the optical pump wavelength to receiver 203. Receivers 202 and 203 convert the received optical signals to electrical signals using techniques well known in the art. The timing relationship between the clock and data signals is illustrated in FIG. 3. Flip-flop 205 is responsive to the clock signals at its CLK input received from receiver 203 via conductor 211 to store data signals received at its D input from receiver 202 via conductor 210. As can be seen from FIG. 3, the leading edge of a clock signal occurs in the middle of a data signal and clocks the data signal into flip-flop 205.

Missing pulse detector 204 is responsive to the clock signals received from receiver 203 via conductor 211 to determine when a clock signal is missing so as to determine the start of a data frame as is illustrated in FIG. 3, since a missing clock signal indicates the end of a data frame. Missing pulse detector 204 is responsive to a missing clock signal to continuous output a "1" until the falling edge of the next clock signal. The rising edge of a clock signal following a missing clock signal is the start of a new data frame. Flip-flop 206 is responsive to a "1" at its D input received from missing pulse detector 204 via conductor 212 and the rising edge of the next clock signal to store a "1" indicating the start of a new data frame as illustrated in FIG. 3. The next clock signal after the start of a data frame will cause a "0" to be stored in flip-flop 206, since the output of missing pulse detector 204 will be a "0". Flip-flop 208 is responsive to the recovered clock signals from receiver 203 to clock data signals received at its D input from the remainder of terminal 106 to star coupler/optical amplifier 102 via transmitter 207 and optical fiber 115.

Figure 4:
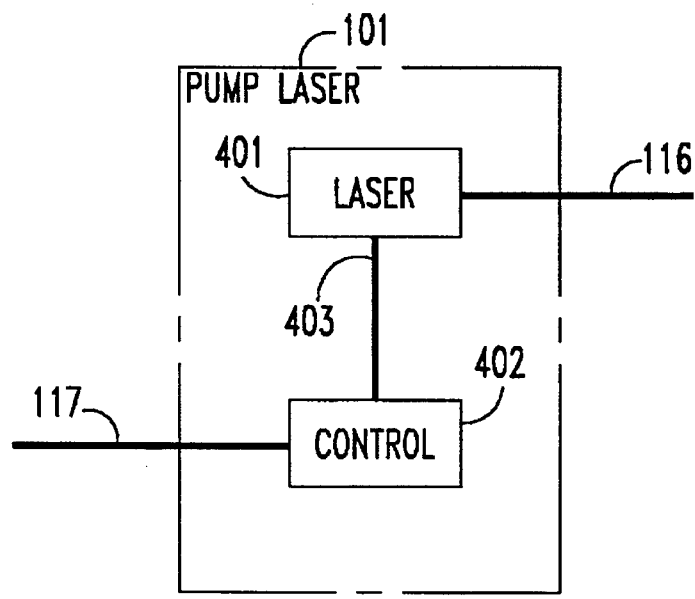
FIG. 4 illustrates an embodiment for controlling a pump laser.
Figure 5:
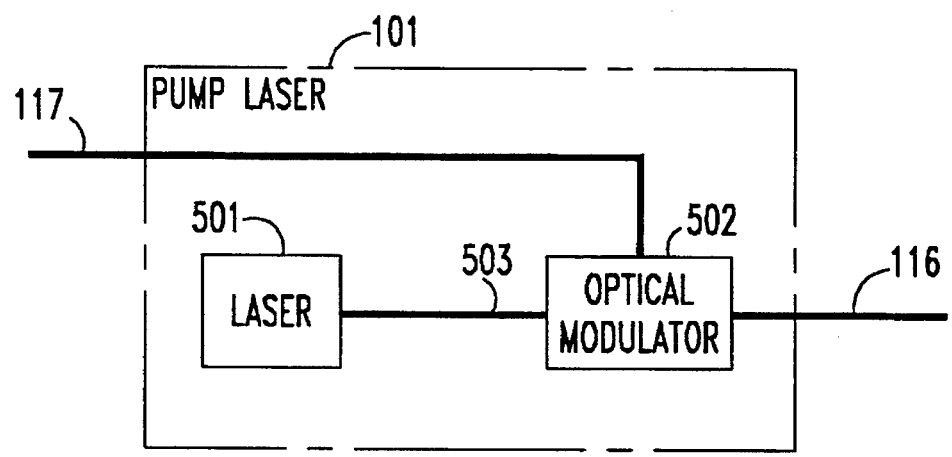
FIG. 5 illustrates another embodiment for controlling a pump laser.

FIG. 4 illustrates, in block diagram form, an embodiment of pump laser 101. Laser 401 is controlled by control 402 via conductor 403. In response to clock signals received via conductor 117, control 402 switches laser 401 to its sub- threshold bias level when the clock signals on line 304 are high and to the on-level to generate the waveform illustrated in line 302 of FIG. 3. FIG. 5 illustrates, in block diagram form, another embodiment of pump laser 101. Laser 501 generates continuous light which is communicated to optical modulator 502 via optical path 503. In response to clock signals received via conductor 117, optical modulator 502 is turned on when the clock signals on line 304 are low and off when the clock signals on line 304 are high so that the fight emitted to optical fiber 116 is the waveform illustrated in line 302 of FIG. 3. Advantageously, optical modulator 502 may be a lithium niobate switch.

It is to be understood that the above-described embodiments are merely illustrative of the principles of the invention and that other arrangements may be devised by those skilled in the art without departing from the spirit or scope of the invention. In particular, other optical switching systems may be readily devised by those skilled in the art which take advantage of the invention. In particular, systems using semiconductor optical amplifiers in which the gain can be electrically modulated could readily take advantage of the principles of the invention.

I claim:

1. An apparatus in an optical switching system for supplying clock signals to a plurality of terminals connected to an optical switching network and said optical switching network responsive to data signals received at an optical wavelength from said terminals to switch said light at said optical wavelength between said terminals, comprising:

means for generating said clock signals in said optical switching system;

a pump optical source for producing optical energy at another optical wavelength;

an optically pumped optical amplifier having a signal input, a pump input and an output terminal in said optical switching network;

means in said optical switching network for interrupting said pump optical source at said other optical wavelength of light in response to a predefined portion of each of said clock signals and for not interrupting said pump optical source a remaining portion of each of said clock signals;

said amplifier responsive to said data signals at said optical wavelength received on said signal input terminal for amplifying said data signals at said optical wavelength using said optical energy at said other optical wavelength from said pump optical source and for combining the amplified data signals at said optical wavelength with said other optical wavelength on an output terminal;

means in optical switching network for transmitting said combined light to said terminals;

each of said terminals comprising an optical wavelength division demultiplexer for separating said light at said optical wavelength and said light at said other optical wavelength;

a receiver for converting said data signals in said optical Wavelength to electrical data signals and another receiver for directly converting said clock signals in said other optical wavelength to electrical clock signals; and means for storing one of said electrical data signals in response to each of said clock signals.

2. The apparatus of claim 1 wherein said amplifier further comprises a rare earth doped optical fiber and said pump optical source is a laser.

3. The apparatus of claim 2 wherein said interrupting means comprises means for placing said laser in an off state in response to predefined portions of said clock signals whereby said off state of said laser represents one of said predefined portion of said clock signals.

4. The apparatus of claim 2 wherein said interrupting means comprises means for optically blocking optical energy from said laser to said optically pumped optical amplifier in response to each of said predefined portions of said clock signals.

5. The apparatus of claim 4 wherein said combining means is an optical wavelength division multiplexer.

* * * * *